(12) United States Patent
Sills et al.

(10) Patent No.: US 7,113,551 B2
(45) Date of Patent: Sep. 26, 2006

(54) TRANSMITTER WITH LIMITED SPECTRAL REGROWTH AND METHOD THEREFOR

(75) Inventors: James A. Sills, Scottsdale, AZ (US); Roland Sperlich, Jr., Westmount (CA)

(73) Assignee: Intersil Corporation, Palm Bay, FL (US)

( * ) Notice: Subject to any disclaimer, the term of this patent is extended or adjusted under 35 U.S.C. 154(b) by 728 days.

(21) Appl. No.: 10/294,936

(22) Filed: Nov. 12, 2002

(65) Prior Publication Data

US 2004/0017859 A1 Jan. 29, 2004

Related U.S. Application Data

(60) Provisional application No. 60/398,646, filed on Jul. 25, 2002.

(51) Int. Cl.
H04K 1/02 (2006.01)
H04L 25/03 (2006.01)
H04L 25/49 (2006.01)

(52) U.S. Cl. ............... 375/297; 375/296; 330/136; 455/114.3

(58) Field of Classification Search ........... 330/10, 330/107, 149, 160–62, 63, 136, 151; 375/296–98, 375/285, 297; 455/69, 115, 116, 126, 127, 455/63, 114.3; 327/307
See application file for complete search history.

(56) References Cited

U.S. PATENT DOCUMENTS

| | | | |
|---|---|---|---|
| 5,049,832 A | 9/1991 | Cavers | |
| 5,559,807 A | 9/1996 | van den Heuvel et al. | |
| 5,732,333 A | 3/1998 | Cox et al. | |
| 5,778,029 A | 7/1998 | Kaufman | |
| 5,867,065 A | 2/1999 | Leyendecker | |
| 5,959,499 A | 9/1999 | Khan et al. | |
| 6,125,266 A | 9/2000 | Mater et al. | |
| 6,141,390 A | 10/2000 | Cova | |
| 6,236,837 B1* | 5/2001 | Midya | 455/63.1 |
| 6,396,345 B1* | 5/2002 | Dolman | 330/149 |
| 6,600,792 B1* | 7/2003 | Antonio et al. | 375/297 |
| 6,697,436 B1* | 2/2004 | Wright et al. | 375/296 |
| 6,737,918 B1* | 5/2004 | Oishi et al. | 330/149 |
| 6,853,246 B1* | 2/2005 | Bauder et al. | 330/149 |

OTHER PUBLICATIONS

"RF and Communications" Analog Devices Nov. 2001.*
J. A. Sills and R. Sperlich, Adaptive Power Amplifier Linearization by Digital Pre-distortion Using Genetic Algorithms—Rawcon 2002 IEE Conference, Boston Mass. Aug. 11-14, 2002.

(Continued)

*Primary Examiner*—Jay K. Patel
*Assistant Examiner*—Sophia Vlahos
(74) *Attorney, Agent, or Firm*—Meschkow & Gresham, P.L.C.

(57) ABSTRACT

A transmitter for a digital transmission signal includes a pre-distorter to improve linearity of a power amplifier. An amplified transmission signal is conditioned into a narrowband feedback signal that is responsive to a logarithm of the power appearing in out-of-band components of the amplified transmission signal. The feedback signal is processed in a pre-distortion processor that implements a genetic algorithm to adapt pre-distortion functions implemented in the pre-distorter and improve linearity over time. The genetic algorithm tests a population of randomly-generated pre-distortion functions for fitness. A baseline component of the coefficients from pre-distortion functions used in a subsequent population tracks the best-fit pre-distortion function from the current population, allowing the use of a limited search space. New populations are generated from old populations using an elitism process, and randomized crossover, and mutation processes.

25 Claims, 5 Drawing Sheets

OTHER PUBLICATIONS

Shawn P. Stapleton and Falviu C. Costescu, An Adaptive Predistorter for a Power Amplifier Based on Adjacent Channel Emissions—IEEE Transactions on Vehicular Technology, vol. 41, No. 1, Feb. 1992.

Darrell Whitley, A Genetic Algorithm Tutorial, Statistics and Computing, vol. 2, p. 65-85, 1994.

Michael Faulkner and Mats Johansson, Adaptive Linearization Using Predistortion—Experimental Results, IEEE Transactions on Vehicular Technology, vol. 43, No. 2, May 1994.

G. Baudoin and P.Jardin, Adaptive Polynomial Pre-distortion for Linearization of Power Amplifiers in Wireless Communications and WLAN, Eurocon 2001, Trends in Communications, vol. 1, p. 157-160.

Robert A. Monzingo and Frank Amoroso, Suppress Spectral Sidelobe Regrowth with Data Signal Pre-distortion, Applied Microwave & Wireless, p. 62-70.

Advanced Design System Power Amplifier Linearization Course, By Agilent Technologies 2001.

James K. Cavers and Maria W Liao, Adaptive Conmpensation for Imbalance and Offset Losses in Direct Conversion Transceivers, IEEE Transactions on Vehicular Technology, vol. 42, No. 4, Nov. 1993.

* cited by examiner

TRANSMITTER WITH LIMITED SPECTRAL REGROWTH AND METHOD THEREFOR

RELATED INVENTION

The present invention claims priority under 35 U.S.C. §119(e) to: "Adaptive Power Amplifier Linearization by Digital Pre-Distortion Using Genetic Algorithms," Provisional U.S. Patent Application Ser. No. 60/398,646, filed 25 Jul. 2002, which is incorporated by reference herein.

TECHNICAL FIELD OF THE INVENTION

The present invention relates generally to the field of electronic transmitters for transmission signals. More specifically, the present invention relates to pre-distorters that linearize power amplifiers and to adaptive processes for determining pre-distortion functions implemented in the pre-distorters.

BACKGROUND OF THE INVENTION

Power amplifiers are one of the most expensive and most power-consuming devices in communication systems. Digital pre-distortion is a technique that reduces power amplifier cost while improving efficiency. Pre-distortion refers to distortion intentionally applied to a transmission signal prior to amplification in a power amplifier. The distortion is desirably configured to be the inverse of unwanted distortion introduced by the power amplifier, so that the resulting amplified transmission signal comes out as nearly linear as possible.

With the use of pre-distortion, the linearity is improved and extended so that the power amplifier can be operated at a higher percentage of its power rating. This means that a lower-power, lower-cost linearized power amplifier can be used in place of a higher-power, higher-cost power amplifier that must be operated at a lower percentage of its power rating to achieve a desired linearity. Furthermore, the linearized power amplifier operates more efficiently. For a given output power level a lower-power amplifier operating more efficiently consumes substantially less power than an inefficient higher-power amplifier. Moreover, these benefits are even more pronounced for multicarrier applications where peak-to-average ratios tend to be large.

In general, gain and phase transfer characteristics of a typical power amplifier change as a function of the magnitude of the transmission signal being amplified. In particular, gain tends to droop and phase shift tends to increase as transmission signal magnitude approaches a saturation point for the power amplifier. Accordingly, a typical linearizer will implement pre-distortion functions that amplify the transmission signal by an amount which is a function of magnitude to compensate for gain droop, and apply an opposing-polarity phase shift as a function of magnitude to compensate for the power amplifier-induced phase shift.

Adaptive pre-distortion utilizes a feedback signal to determine the characteristics of the pre-distortion functions applied to the transmission signal by the pre-distorter. Gradient techniques have been used to compare pre-distorter input and power amplifier output values on a sample-by-sample basis in both amplitude and phase and thereby adapt the pre-distortion functions implemented by the pre-distorter over time to improve linearity. Unfortunately, the poor linearity which is inherently exhibited prior to adaptation of a pre-distorter can lead to extensive intermodulation products and significant spectral regrowth. This necessitates processing a wideband feedback signal having a bandwidth that can be many times the bandwidth of the transmission signal itself. A very expensive, high performance, analog-to-digital converter is therefore used in the feedback signal path. Such a high performance analog-to-digital converter can end up being the most expensive component in the transmitter and can greatly diminish any power amplifier cost savings gained by using pre-distortion.

Narrowband feedback results from processing only out-of-band emissions. The use of a narrowband feedback signal would permit the use of a less expensive and more desirable analog-to-digital converter in the feedback signal path. But conventional attempts at implementing adaptive pre-distortion using narrowband feedback have provided unsatisfactory results. Conventional techniques have attempted to use gradient adaptation methods similar to those used for wideband feedback. But these methods are able to converge in only specialized situations, and they tend to converge slowly. Consequently, the conventional narrowband feedback methods produce an undesirable amount of adjacent channel power.

SUMMARY OF THE INVENTION

It is an advantage of the present invention that an improved transmitter with limited spectral regrowth and method therefor are provided.

Another advantage of the present invention is that narrowband feedback is used to adapt pre-distortion functions implemented in a pre-distorter.

Another advantage is that a form of a genetic algorithm is implemented to achieve acceptable convergence in a wide variety of circumstances to limit adjacent channel power emissions.

Another advantage is that a pre-distortion function adaptation process is provided that characterizes polynomial coefficients as having baseline and offset components, then causes the baseline components to track the convergence process.

These and other advantages are realized in one form by an improved method of processing a transmission signal occupying a predetermined frequency band to reduce spectral regrowth outside the predetermined frequency band. The method calls for transforming the transmission signal in accordance with a pre-distortion function to generate a pre-distorted transmission signal. The pre-distorted transmission signal is amplified in a power amplifier to generate an amplified transmission signal having an in-band component within the predetermined frequency band and an out-of-band component outside the predetermined frequency band. The out-of-band component of the amplified transmission signal is conditioned to generate a feedback signal, and a genetic algorithm is applied to the feedback signal to modify the pre-distortion function.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
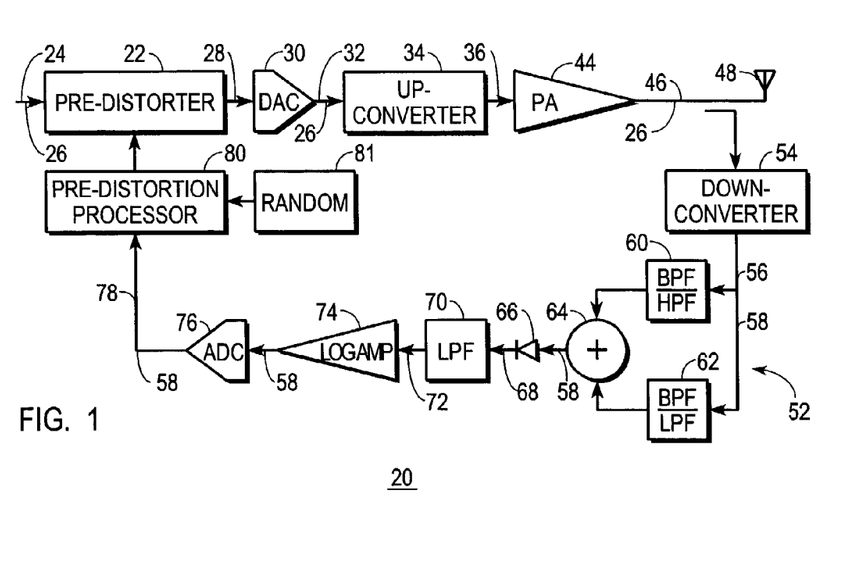
FIG. 1 shows a block diagram of a transmitter configured in accordance with the teaching of the present invention.

FIG. 1 shows a block diagram of a transmitter 20 configured in accordance with the teaching of the present invention. Transmitter 20 includes a pre-distorter 22 adapted to receive a modulated form 24 of a transmission signal 26 and transform the modulated transmission signal 24 in accordance with pre-distortion functions programmed therein. The modulated transmission signal 24 may be a digital communication signal expressed as a stream of quadrature data values. The modulated transmission signal 24 may have been modulated to convey digital data via phase mapping, via CDMA techniques, or the like; it may have been pulse shaped to spread the modulated energy for each unit interval over a number of unit intervals; and/or, it may have been compressed to reduce its peak-to-average ratio. But the precise processing applied to the modulated transmission signal 24 prior to its application at pre-distorter 22 is not a critical feature of the present invention.

Nor is the precise configuration of pre-distorter 22 a critical feature of the present invention. Various pre-distorter architectures known to those skilled in the art may be adapted for use in pre-distorter 22. In one preferred embodiment, pre-distorter 22 determines the magnitude of modulated transmission signal 24, uses this magnitude as an address of a look-up-table (LUT, not shown), then extracts data from the LUT to add back with modulated transmission signal 24 to generate a pre-distorted form 28 of transmission signal 26. In this embodiment, the LUT implements pre-distortion functions that are applied by pre-distorter 22 to modulated transmission signal 24. One preferred set of pre-distortion functions may take the form of an amplitude polynomial $F_a(|v_i(t)|^2)$ and a phase polynomial $F_\Phi(|v_i(t)|^2)$, where each polynomial is a function of the magnitude of the input signal $v_i(t)$, and each has a plurality of magnitude terms, with each term having its own coefficient $C_z$, as follows:

$$F_a(|v_i(t)|^2) = \sum_{z=0}^{k-1} C_z * |v_i(t)|^{2*z} \qquad \text{EQ. 1}$$

$$F_\Phi(|v_i(t)|^2) = \sum_{z=k}^{L-1} C_z * |v_i(t)|^{2*(z-k+1)} \qquad \text{EQ. 2}$$

where, L and k are integers such that: 0<k<L, and
where k=4 and L=7 are workable examples.

In this embodiment, a pre-distortion function value for each possible magnitude input is calculated using the pre-distortion functions then programmed into the LUT. In a second embodiment, the output from the LUT directly provides the pre-distorted transmission signal 28 generated by pre-distorter 22. In this second embodiment, the pre-distortion function value for each possible magnitude input is calculated using the pre-distortion functions, then each pre-distortion function value is added to its magnitude input, and the result is programmed in the LUT. In a third embodiment, pre-distorter 22 is configured to include various multipliers and adders to directly implement the pre-distortion functions within pre-distorter 22. In this third embodiment, no LUT is required, but coefficients $C_z$ are programmed into pre-distorter 22. These and other embodiments for pre-distorter 22 fall within the scope of the present invention.

Pre-distorted transmission signal 28 is routed to an input of a digital-to-analog converter (DAC) 30, where it is converted into an analog form 32 of transmission signal 26. An up-converter 34 then up-converts analog transmission signal 32 to a radio-frequency (RF) form 36 of transmission signal 26 using conventional up-conversion techniques.

Figure 2:
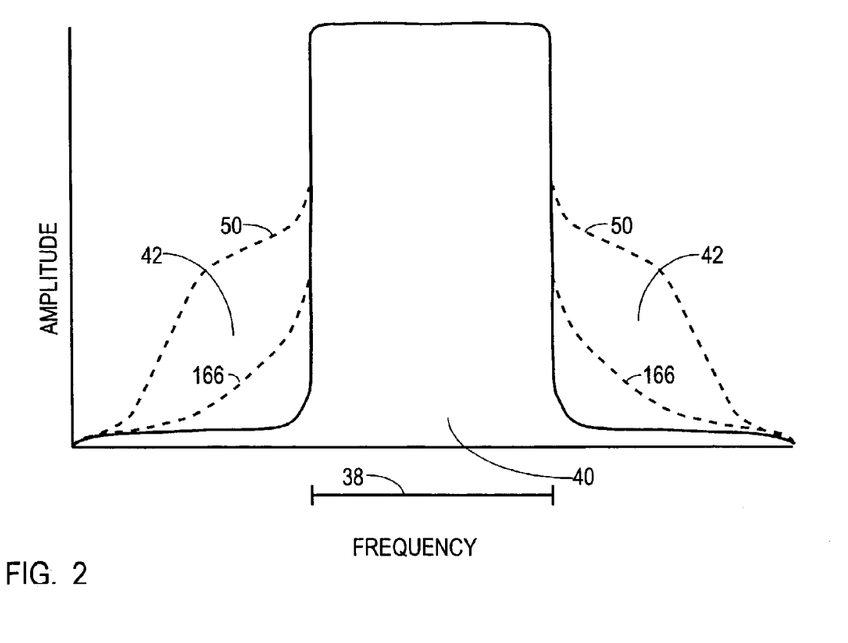
FIG. 2 shows an exemplary graph of frequency versus amplitude for an amplified transmission signal generated by the transmitter of FIG. 1.

FIG. 2 shows an exemplary graph of frequency versus amplitude for transmission signal 26, perhaps even as broadcast from transmitter 20. Transmission signal 26 desirably confines most of its power to an RF band 38. RF band 38 is the frequency band assigned to transmitter 20, typically by a regulating agency such as the FCC or ETSI, for use in broadcasting RF signals. The amount of energy that transmitter 20 is permitted to broadcast outside of RF band 38 is typically strictly limited. The power appearing within RF band 38 is referred to herein as in-band components 40, while power appearing outside RF band 38, whether above or below RF band 38, is referred to herein as out-of-band components 42.

Referring to FIGS. 1 and 2, RF transmission signal 36, as generated by up-converter 34, may now be confined substantially to RF band 38, with very little of out-of-band components 42. But RF transmission signal 36 is then amplified in a power amplifier 44 to generate an amplified form 46 of transmission signal 26. Amplified transmission signal 46 is then routed to an antenna 48, where it is broadcast from transmitter 20.

The preferred embodiment contemplates the use of a relatively inexpensive, conventional power amplifier that attempts to linearly amplify its input signal, but which inevitably falls short of achieving this goal. In order to operate power amplifier 44 efficiently, power amplifier 44 is desirably operated at or near it saturation point. A relatively inexpensive power amplifier may be used because, due to the operation of pre-distorter 22, it may be operated at a very low back-off point, and it need not be highly linear when so operated. When operated near its saturation point, the gain of power amplifier 44 may droop significantly, and the phase shift experienced through power amplifier 44 may sag significantly. But for the operation of pre-distorter 22, this power amplifier distortion would produce intermodulation products that would cause spectral regrowth. In other words, out-of-band components 42 would increase, often above permitted levels. Dotted skirt-lines 50 in FIG. 2 depict exemplary worst-case out-of-band components 42 that may be expected when pre-distorter 22 applies little or no pre-distortion to transmission signal 26.

A conditioning circuit 52 monitors and conditions a small portion of the energy from amplified transmission signal 46. FIG. 1 depicts conditioning circuit 52 as including an optional down-converter 54 that down-converts amplified transmission signal 46 to generate an IR or baseband form 56 of a feedback signal 58. FIG. 2 illustrates the frequency spectrum of feedback signal 58 after such a down-conversion. In this embodiment, down-converter 54 shifts amplified transmission signal 46 downward in frequency so that in-band components 40 remain well above a zero frequency and so that out-of-band components 42 remain separated from in-band components 40.

FIG. 1 depicts feedback signal 56 as being routed to filters 60 and 62. Filter 60 may be a band-pass filter (BPF) or a high-pass filter (HPF) that substantially passes the higher frequency out-of-band components 42 but substantially excludes or blocks in-band components 40; and, filter 62 may be a band-pass filter (BPF) or a low-pass filter (LPF) that substantially passes the lower frequency out-of-band components 42 but substantially excludes or blocks in-band components 40. Outputs of filters 60 and 62 are combined, for example by adding, in a combining circuit 64, and then routed to an envelope detector 66, schematically shown using a diode symbol. Envelope detector 66 generates a narrow-band, power form 68 of feedback signal 58.

Those skilled in the art will appreciate that conditioning circuit 52 may generate narrow-band power signal 68 using alternate techniques. For example, in some applications, down-converter 54 may be omitted altogether. In other applications, down-converter 54 may shift the frequency of the center of RF band 38 (FIG. 2) to zero, thereby causing the lower and upper out-of-band components 42 to be folded on top of one another, to remain separated from in-band components 40, and to now be greater than in-band components 40 in frequency. In this embodiment, combining circuit 64 and filter 62 may be omitted. These and other equivalent techniques are included in the scope of the present invention.

A low pass filter 70 receives narrow-band power signal 68 and smoothes narrow-band power signal 68 to generate a smoothed, narrow-band power form 72 of feedback signal 58. Smoothed, narrow-band power signal 72 is applied to a logarithmic amplifier 74, causing feedback signal 58 to be responsive to the logarithm of the power exhibited by out-of-band components 42. An output of logarithmic amplifier 74 is routed to an analog-to-digital converter (ADC) 76, which digitizes the logarithmically amplified form of feedback signal 58 to produce a digitized form 78 of feedback signal 58.

ADC 76 may be an inexpensive ADC. ADC 76 converts a narrow-band, smoothed power signal that merely characterizes the envelope of out-of-band components 42. Subsequent processing of feedback signal 58 need not consider the frequencies exhibited by out-of-band components 42. Thus, no requirement for rapid conversions is imposed on ADC 76. Not only does elimination of a requirement for high-speed conversion lead to component cost savings, but operation at lower speed also leads to power savings. In addition, logarithmic amplifier 74 compresses the dynamic range of feedback signal 58 so that ADC 76 need not provide a large number of bits of resolution.

The digitized feedback signal 78 generated by ADC 76 is routed to a pre-distortion processor 80, and an output of pre-distortion processor 80 couples to pre-distorter 22. Pre-distortion processor 80 may be implemented using a digital signal processor (DSP), microprocessor, or other programmable control device known to those skilled in the art. Processor 80 may include components conventionally included in programmable devices, such as memory for storing programming instructions along with variables and tables manipulated while executing the instructions, a control unit for performing mathematical and other data manipulation operations, and a timer for efficiently tracking the passage of time. FIG. 1 depicts a separate random number generator 81 that provides inputs to pre-distortion processor 80, but those skilled in the art will appreciate that random number generator 81 may be included within pre-distortion processor 80 or that various software routines can be devised to provide the equivalent functions. As discussed in more detail below, in one preferred embodiment of the present invention pre-distortion processor 80 applies a genetic algorithm to feedback signal 58 to modify the pre-distortion functions (see EQ. 1 and EQ. 2) implemented in pre-distorter 22.

Figure 3:
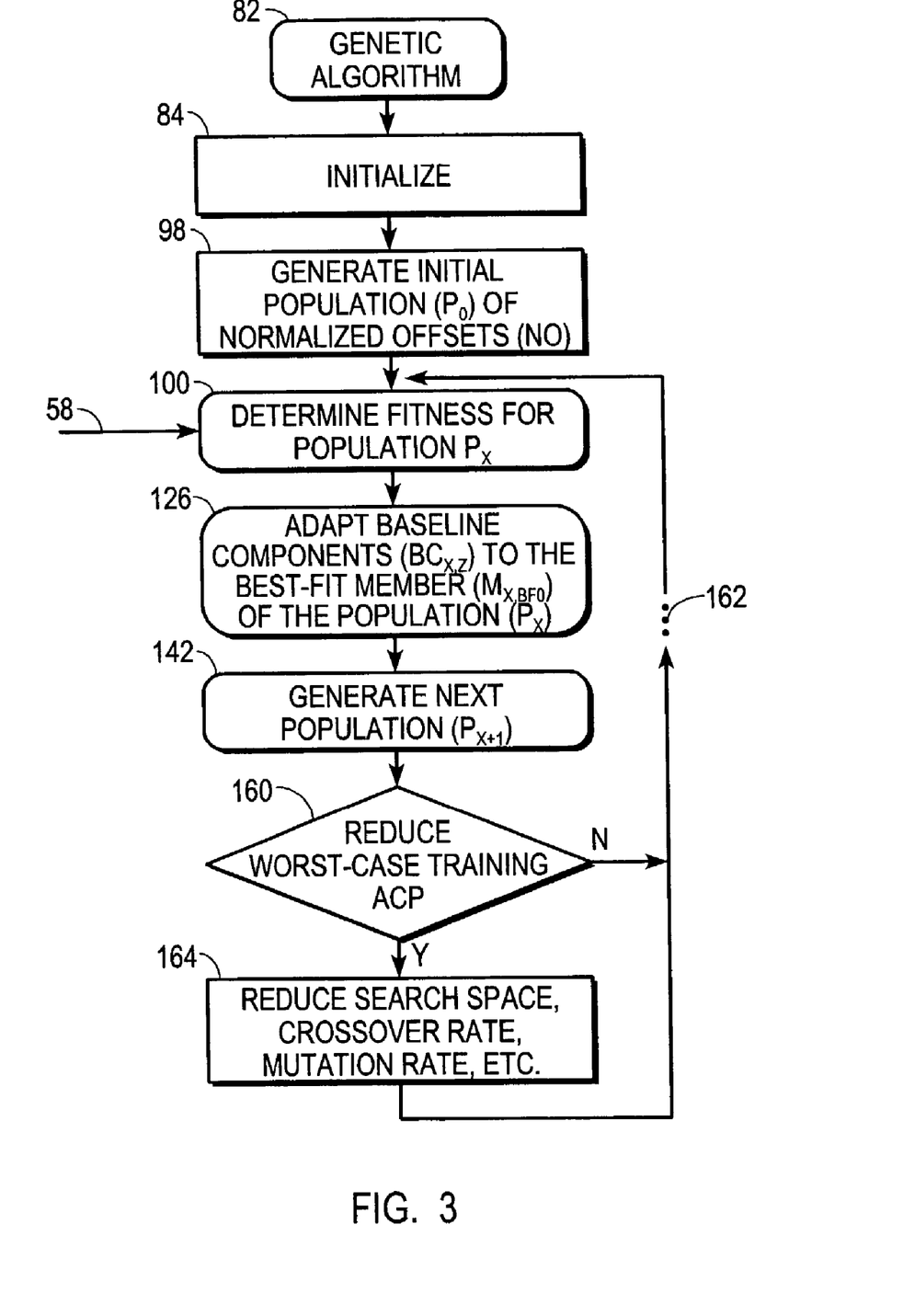
FIG. 3 shows a flow chart of a type of genetic algorithm configured in accordance with the teaching of the present invention to adapt pre-distortion functions implemented in a pre-distorter portion of the transmitter of FIG. 1.

FIG. 3 shows a flow chart of a type of genetic algorithm 82 configured in accordance with the teaching of the present invention that may be implemented by pre-distortion processor 80 (FIG. 1). Genetic algorithm 82 may be implemented through the execution of programming instructions in a manner well known to those skilled in the art. In general, genetic algorithm 82 monitors feedback signal 58, calculates coefficients $C_{z=0 \to L-1}$ used by the pre-distortion functions implemented in pre-distorter 22 (FIG. 1), and programs pre-distorter 22 to implement the pre-distortion functions defined by coefficients $C_{z=0 \to L-1}$. The variable "z" is an integer indicating a coefficient index number, and the variable "L" is an integer indicating the number of coefficients used to define the pre-distortion functions.

For the purposes of the present discussion, genetic algorithm 82 is assumed to begin at a power-on or reset condition with a task 84. Task 84 initializes certain variables used in the processing performed by genetic algorithm 82. For example, an initial set of coefficients $C_{z=0 \to L-1}$ may be specified, or at least partially specified, in task 84. But in the preferred embodiment, each of coefficients $C_{z=0 \to L-1}$ is defined to have a baseline component $BC_z$ and an offset component $OC_z$ configured so that:

$$C_z = BC_z + OC_z \qquad \text{EQ.3}$$

Thus, task 84 may specify initial values for a number of baseline coefficients $BC_{z=0 \to L-1}$. Offset coefficients $OC_{z=0 \to L-1}$ may be specified in other tasks discussed below. Task 84 desirably specifies initial values for baseline coefficients $BC_{z=0 \to L-1}$ that characterize a typical or generic set of pre-distortion functions assuming offset coefficient $OC_{z=0 \to L-1}$ values of zero and without regard to special characteristics of the components included in this individual transmitter 20.

Figure 4:
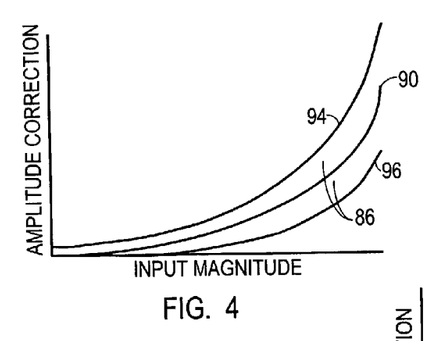
FIG. 4 shows a graph of a search space associated with an amplitude portion of pre-distortion functions potentially implemented in the pre-distorter of the transmitter of FIG. 1.
Figure 5:
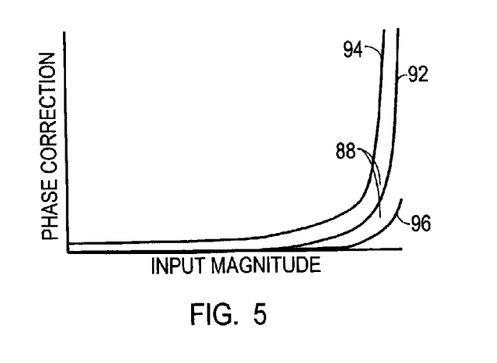
FIG. 5 shows a graph of a search space associated with a phase portion of pre-distortion functions potentially implemented in the pre-distorter of the transmitter of FIG. 1.

FIGS. 4 and 5 respectively show graphs of exemplary search spaces 86 and 88 associated with amplitude and phase portions of the pre-distortion functions implemented in pre-distorter 22. The graphs of FIGS. 4 and 5 show the amplitude and phase corrections added to modulated transmission signal 24 so that a more linear response will be demonstrated in amplified transmission signal 46 (FIG. 1).

The different curves depicted in FIGS. 4 and 5 represent different sets of coefficients $C_{z=0 \to L-1}$ that can be used to define pre-distortion functions. In other words, all of coefficients $C_{z=0 \to L-1}$ taken together define a single curve in the amplitude correction graph of FIG. 4 and also define a single curve in the phase correction graph of FIG. 5. For example, amplitude and phase baseline curves 90 and 92 may respectively depict pre-distortion functions that result from initial values assigned to baseline coefficients $BC_{z=0 \to L-1}$, with offset coefficients $OC_{z=0 \to L-1}$ set to zero. Search spaces 86 and 88 reside between upper and lower boundary curves 94 and 96 and are proximate baseline curves 90 and 92. Search spaces 86 and 88 establish constraints placed on offset coefficients $OC_{z=0 \to L-1}$ to restrict the curves depicting potential to-be-generated pre-distortion functions to reside in regions proximate baseline curves 90 and 92. FIGS. 4 and 5 depict search spaces 86 and 88 as residing on positive and negative sides of baseline curves 90 and 92, respectively. This arrangement causes offset components $OC_{z=0 \to L-1}$ to exhibit both positive and negative values. In alternate embodiments, search spaces 86 and 88 may reside entirely above (or below) baseline curves 90 and 92, respectively, causing offset components $OC_{z=0 \to L-1}$ to exhibit only positive (or only negative) values.

The parameters that establish the size of search spaces 86 and 88 may also be defined in task 84. The parameters may include a search space range $SSR_{z=0 \to L-1}$ and search space offset $SSO_{z=0 \to L-1}$ for each coefficient. Other variables that may be initialized in task 84 are discussed below where appropriate.

Referring back to FIG. 3, following task 84, a task 98 generates an initial population $P_{x=0}$ of normalized offsets, where "x" describes the general situation which may refer to any population (i.e., "x" is a population index) and where x=0 for the initial population. Normalized offsets have a one-to-one correspondence with offset components $OC_{z=0 \to L-1}$ but differ from offset components in being normalized to disassociate them from any particular search space. In the preferred embodiment, each normalized offset may be instantiated with a value in the range of −128 to +127, regardless of search space configuration, but this range is not a feature of the present invention. Normalized offsets may be translated into offset components $OC_{z=0 \to L-1}$ using a scaling operation such as the following:

$$OC_{z=0 \to L-1} = NO_z * SSR_z + SSO_z \qquad EQ.4$$

where, $NO_z$ is the $z^{th}$ normalized offset.

A set of "L" normalized offsets $NO_{z=0 \to L-1}$, define a single member $M_{x,y}$ of a population $P_x$. Thus, for the general case, a population may be expressed as:

$$P_x = \begin{vmatrix} M_{x,0} \\ M_{x,1} \\ \vdots \\ M_{x,N-1} \end{vmatrix} \qquad EQ.5$$

where, $$M_{x,y} = |NO_{x,y,0} NO_{x,y,1} \ldots NO_{x,y,L-1}|. \qquad EQ.6$$

Task 98 may generate the initial population $P_0$ having N members $M_{0,y=0 \to N-1}$ using random numbers from random number generator 81 (FIG. 1). For the preferred embodiment, each random number exhibits a value in the range of −128 to +127. Each member $M_{0,y}$ of the initial population $P_0$ defines a set of pre-distortion functions (EQ. 1–2) when considered in accordance with the relationships set forth above in EQ. 3–4. In the preferred embodiments, N=20→100 members.

After task 98, a sub-process 100 determines the fitness of the members $M_{x,y=0 \to N-1}$ for the population $P_x$, where x=0 for the initial population $P_0$ but increments thereafter for subsequent iterations of sub-process 100.

Figure 6:
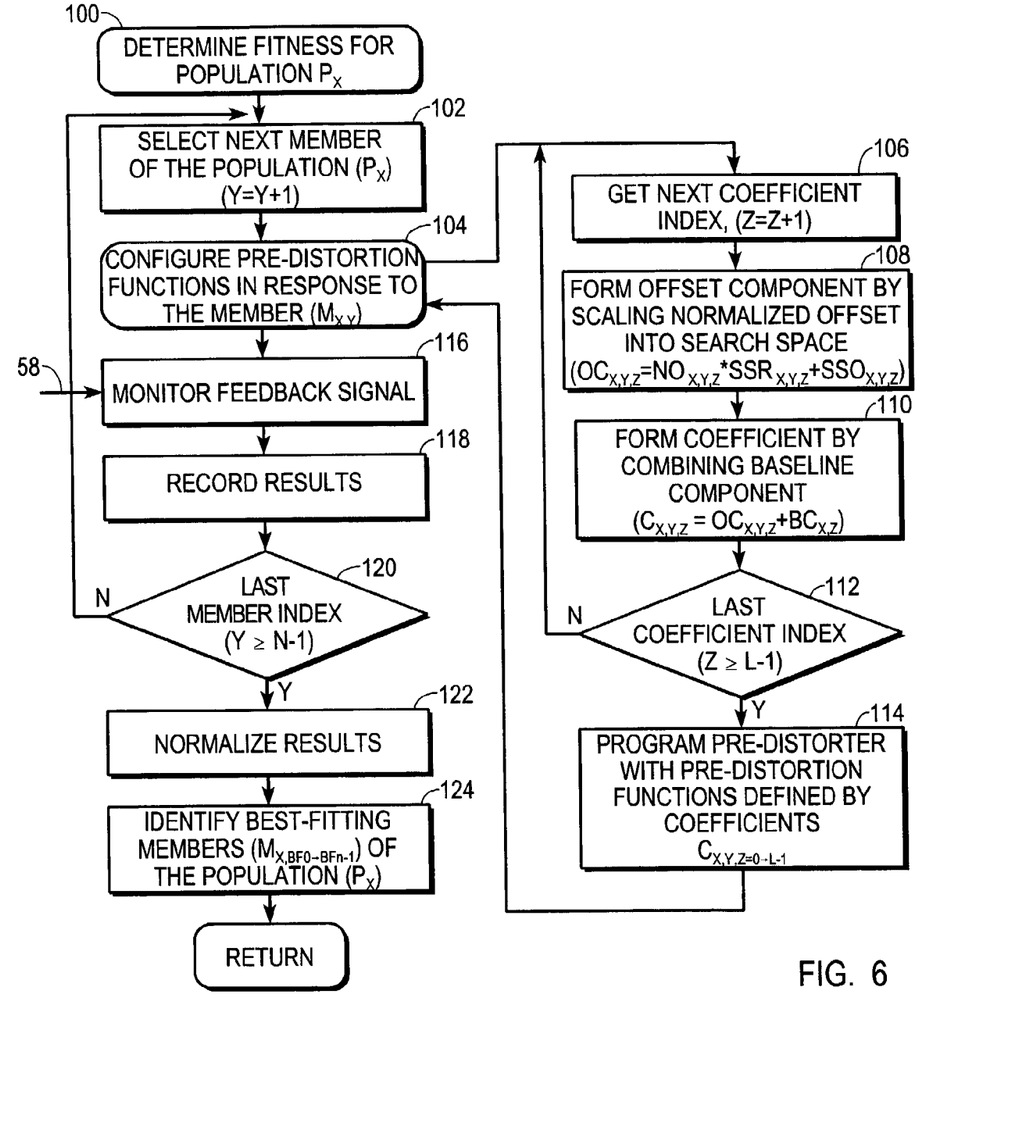
FIG. 6 shows a flow chart of an exemplary sub-process for determining fitness for a population of pre-distortion functions, as used by the genetic algorithm of FIG. 3.

FIG. 6 shows a flow chart of an exemplary sub-process 100 for determining fitness for a population of pre-distortion functions. In a general sense, fitness refers to the ability of a member $M_{x,y}$ to linearize transmitter 20, and sub-process 100 determines fitness for all members $M_{x,y=0 \to N-1}$ of a population $P_x$.

Sub-process 100 includes a housekeeping task 102 that selects a next member $M_{x,y}$ of the population $P_x$ being evaluated. Task 102 may be implemented by incrementing a counter such that y=y+1. Task 102 is included in a programming loop and executed "N" times. Upon the completion of the first iteration of task 102, y=0. After task 102, a sub-process 104 is performed in which the pre-distortion functions are configured in response to the member $M_{x,y}$ identified in task 102 and programmed into pre-distorter 22 (FIG. 1).

Sub-process 104 includes a task 106 to get a next coefficient index. Task 106 may be implemented by incrementing a counter such that z=z+1. Task 106 is included in a programming loop and executed "L" times. Upon the completion of the first iteration of task 106, z=0. After task 106, a task 108 forms an offset component $OC_{x,y,z}$ from the corresponding normalized offset $NO_{x,y,z}$ specified by indexes x, y, and z. Offset component $OC_{x,y,z}$ may be formed by a scaling operation, such as the one defined by the relationship of EQ. 4. Task 108 scales a new offset component $OC_{x,y,z}$ to reside within its own search space that, together with the search spaces of other offset components for this member $M_{x,y}$, forms search spaces 86 and 88 (FIGS. 4–5). Next, a task 110 forms a coefficient $C_{x,y,z}$ by combining the corresponding baseline component $BC_{x,z}$ with the subject offset component $OC_{x,y,z}$, such as through the relation of EQ. 3.

After task 110, a query task 112 determines whether the last coefficient index has been processed. Task 110 may determine whether z≧L−1. When other coefficients $C_{x,y,z}$ remain to be calculated for the current member $M_{x,y}$, program control loops back to task 106 and repeats tasks 106, 108, 110, and 112. Eventually task 112 discovers that all coefficients $C_{x,y,z}$ have been calculated for the current member $M_{x,y}$. When all coefficients $C_{x,y,z}$ for the current member $M_{x,y}$ have been calculated, a task 114 programs pre-distorter 22 with the pre-distortion functions defined by the coefficients $C_{x,y,z=0 \to L-1}$. Task 114 may directly program pre-distorter 22 with coefficients $C_{x,y,z=0 \to L-1}$, or task 114 may alternatively use the coefficients $C_{x,y,z=0 \to L-1}$ to calculate values to program into a LUT. Upon the completion of task 114, sub-process 104 ends and program flow proceeds to a task 116.

Task 116 monitors feedback signal 58, which is responsive to the logarithm of the power of out-of-band components 42 (FIG. 2) as discussed above. In one embodiment, task 116 may involve waiting until feedback signal 78 becomes stable and reasonably reflects the influence of the pre-distortion functions programmed into pre-distorter 22 in the previous iteration of sub-process 104. In another embodiment (not shown), task 116 may repeat sub-process 104 to program pre-distorter 22 with pre-distortion functions for the next member $M_{x,y+1}$ of the subject population $P_x$ while simultaneously monitoring the feedback signal 78 that results from the previously programmed pre-distortion functions.

After task 116, a task 118 records the results from monitoring feedback signal 58. The recorded results may be a single value representing the logarithm of the power of the out-of-band components 42 generated while using the previously programmed pre-distortion functions. After task 118, a query task 120 determines whether the last member index has been processed. Task 120 may determine whether $y \geq N-1$. When other members $M_{x,y}$ remain to be processed for the current population $P_x$, program control loops back to task 102 and repeats task 102, sub-process 104, and tasks 116, 118, and 120. Eventually task 120 discovers that all members $M_{x,y}$ have been processed for the current population $P_x$.

When all members $M_{x,y}$ have been processed for the current population $P_x$, a task 122 normalizes the results for convenience in subsequent processing. Task 122 calculates a number for each member $M_{x,y}$ reflecting the percentage of the total out-of-band power detected while processing all members $M_{x,y}$ of this population $P_x$. Next, a task 124 identifies the best-fitting members $M_{x,BF0 \to BFn-1}$ of the current population $P_x$. The best-fitting members $M_{x,BF0 \to BFn-1}$ are those "n" members whose pre-distortion functions resulted in the least out-of-band power for all members in this population $P_x$. In the preferred embodiment, only a few members, e.g., n=2→10, are selected as best-fitting members $M_{x,BF0 \to BFn-1}$, and member $M_{x,BF0}$ is the single best-fit member in the population $P_x$. These few best-fitting members $M_{x,BF0 \to BFn-1}$ are referred to as elite members. Following task 124, sub-process 100 is complete, and program control returns to a calling routine, such as genetic algorithm 82 (FIG. 3).

After the completion of sub-process 100, genetic algorithm 82 performs a sub-process 126 to adapt baseline components $BC_{x,z}$ to the to the single, best-fit member $M_{x,BF0}$ of the current population $P_x$.

Figure 7:
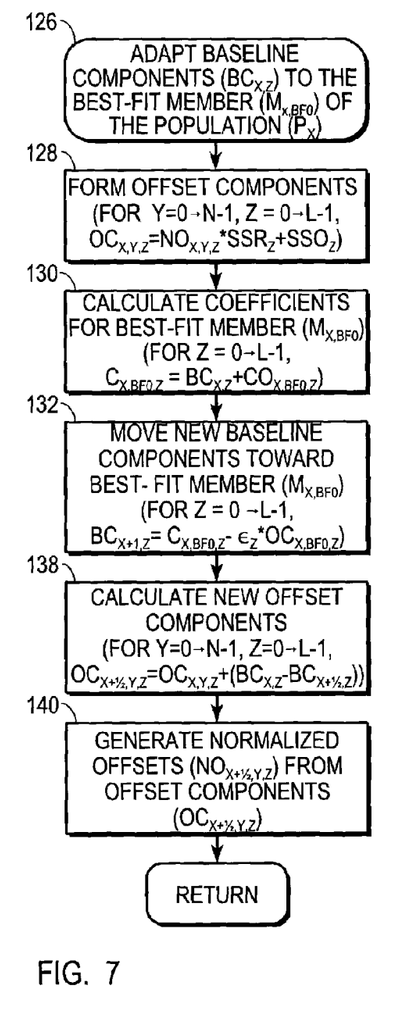
FIG. 7 shows a flow chart of an exemplary sub-process for adapting baseline components of pre-distortion polynomial coefficients, as used by the genetic algorithm of FIG. 3.

FIG. 7 shows a flow chart of an exemplary sub-process 126 for adapting baseline components $BC_{x,z}$ to the single best-fit member $M_{x,BF0}$ of the current population $P_x$. Sub-process 126 performs a task 128 which forms or otherwise obtains offset components $OC_{x,y=0 \to N-1,z=0 \to L-1}$ for all normalized offsets $NO_{x,y,z}$ in the current population $P_x$. Task 128 may form offset components $OC_{x,y=0 \to N-1,z=0 \to L-1}$ by using the relationship of EQ. 4.

After task 128, a task 130 calculates coefficients $C_{x,BF0,z=0 \to L-1}$ for the best-fit member $M_{x,BF0}$. Coefficients $C_{x,BF0,z=0 \to L-1}$ may be formed by using the relationship of EQ. 3.

Next, a task 132 alters old baseline components $BC_{x,y=0 \to L-1}$ into new baseline components $BC_{x+1,z=0 \to L-1}$ by moving the old baseline components $BC_{x,z=0 \to L-1}$ toward best-fit member $M_{x,BF0}$. The subscript notation of "x+1" indicates that the new baseline components will be applicable to the next population which has yet to be generated.

Figure 8:
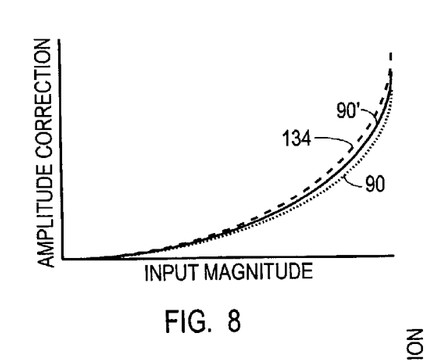
FIG. 8 shows a graph depicting the exemplary adaptation of the baseline components associated with an amplitude portion of the pre-distortion functions.
Figure 9:
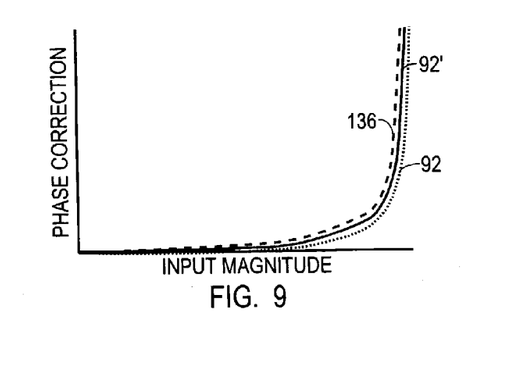
FIG. 9 shows a graph depicting the exemplary adaptation of the baseline components associated with a phase portion of the pre-distortion functions.

FIGS. 8 and 9 respectively show amplitude correction and phase correction graphs similar to those depicted in FIGS. 4 and 5. In particular, FIG. 8 shows a graph depicting the exemplary adaptation of the baseline components associated with the amplitude portion of the pre-distortion functions, and FIG. 9 shows a graph depicting the exemplary adaptation of the baseline components associated with the phase portion of the pre-distortion functions. Amplitude and phase baseline curves 90 and 92 are respectively shown as small-dotted lines in FIGS. 8 and 9. Baseline curves 90 and 92 are defined by the old baseline components $BC_{x,z=0 \to L-1}$ when combined with offset components of zero. Best-fit curves 134 and 136 are respectively shown as large-dotted lines in FIGS. 8 and 9. Best-fit curves 134 and 136 are defined by the old baseline components $BC_{x,z=0 \to L-1}$ when combined with the offset components $OC_{x,BF0,z=0 \to L-1}$ for the best-fit member $M_{x,BF0}$ to form best-fit member coefficients $C_{x,BF0,z=0 \to L-1}$. In task 132, new baseline curves 90' and 92', respectively shown in FIGS. 8 and 9 as solid lines, reside in the search space 86, 88 (FIGS. 3–4) between old baseline curves 90 and 92 and best-fit curves 134 and 136. Hence, the old baseline curves 90 and 92 have been moved toward best-fit curves 134 and 136.

The amount by which old baseline components $BC_{x,z=0 \to L-1}$ move toward best-fit member $M_{x,BF0}$ is determined by a tracking rate $\epsilon_z$. Tracking rate $\epsilon_z$ is a variable that desirably meets the criteria of $0 < \epsilon_z < 1$ and is established during initialization task 84 (FIG. 3). The closer tracking rate $\epsilon_z$ is to zero the less old baseline components $BC_{x,z=0 \to L-1}$ move toward best-fit member $M_{x,BF0}$, and the closer tracking rate $\epsilon_z$ is to one the further old baseline components $BC_{x,z=0 \to L-1}$ move toward best-fit member $M_{x,BF0}$. New baseline components $BC_{x+1,z=0 \to L-1}$ may be defined as follows:

$$BC_{x+1,z=0 \to L-1} = C_{x,BF0,z} - (\epsilon_z * OC_{x,BF0,z}) \qquad \text{EQ. 7}$$

Referring back to FIG. 7, after task 132, a task 138 calculates new offset components $OC_{x+1/2,y=0 \to N-1,z=0 \to L-1}$ for the new entire population $P_{x+1}$ from old offset components $OC_{x,y=0 \to N-1,z=0 \to L-1}$ and the new baseline components $BC_{x+1,z=0 \to L-1}$. The subscript notation "x+½" denotes that the new offset components at this point in genetic algorithm 82 are but an intermediate step in generating the next population. New offset components $OC_{x+1/2,y=0 \to N-1,z=0 \to L-1}$ are formed by altering the old offset components $OC_{x,y=0 \to N-1,z=0 \to L-1}$ by the amount which the new baseline components $BC_{x+1,z=0 \to L-1}$ were moved from the old baseline components $BC_{x,z=0 \to L-1}$.

Next, a task 140 generates new normalized offsets $NO_{x+1/2,y=0 \to N-1,z=0 \to L-1}$ from the new offset components $OC_{x+1/2,y=0 \to N-1,z=0 \to L-1}$ by following the relationship of EQ. 4 in reverse. The best-fit offset components will normally tend toward values of zero. This causes corresponding offset components $OC_{x+1/2,y,z}$ and normalized offsets $NO_{x+1/2,y,z}$ to normally fall within the range of –128 to +127. In the unusual situation where a new normalized offset $NO_{x+1/2,y,z}$ falls outside this range, such a normalized offset $NO_{x+1/2,y,z}$ can be clipped.

When task 140 is complete, sub-process 126 is also complete, and program flow returns to a calling routine, such as genetic algorithm 82 (FIG. 3). Referring briefly to FIG. 3, after sub-process 126 genetic algorithm 82 performs a sub-process 142 to generate the next population $P_{x+1}$ from an old population $P_x$ as modified through the application of sub-process 126 (FIG. 7).

Figure 10:
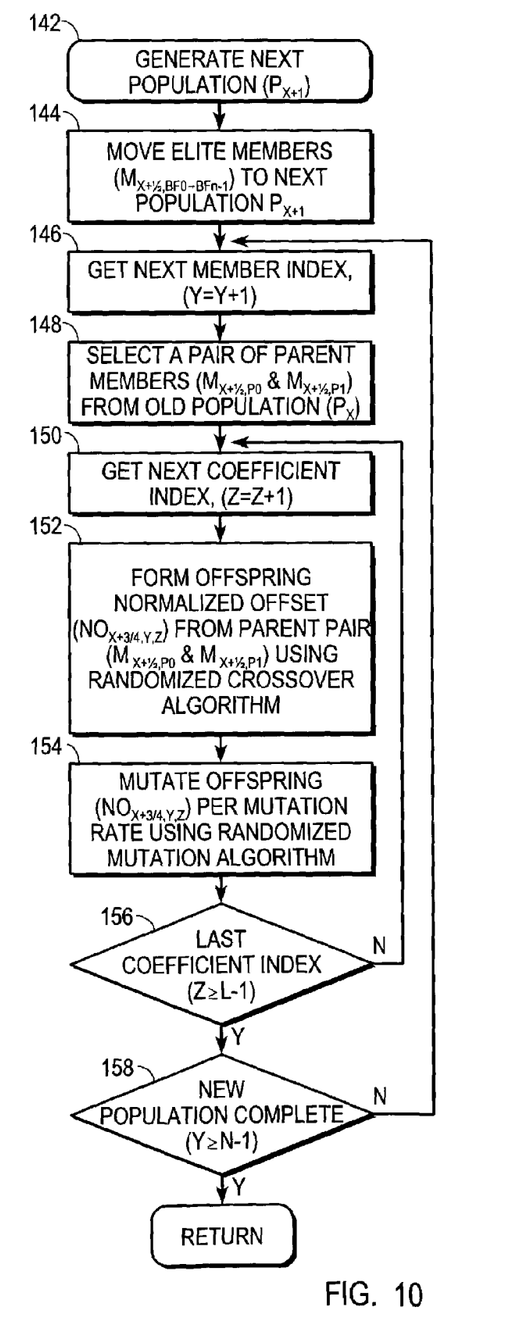
FIG. 10 shows a flow chart of an exemplary sub-process for generating a new population of pre-distortion functions, as used by the genetic algorithm of FIG. 3.

FIG. 10 shows a flow chart of an exemplary sub-process 142. Sub-process 142 includes a task 144 which moves the elite, best-fitting members $M_{x+1/2,BF0 \to BFn-1}$ identified above in task 124 (FIG. 6) to the next population $P_{x+1}$. Best-fitting members $M_{x+1/2,BF0 \to n-1}$ are referenced using the "x+½" subscript notation because they may have been modified in sub-process 126 (FIG. 7). By including elite, best-fitting members $M_{x+1/2,BF0 \to BFn-1}$ in the new population $P_{x+1}$, the fitness for the new population $P_{x+1}$, is guaranteed to be no worse than the fitness for old population $P_x$.

Next, a housekeeping task 146 manipulates a member index by incrementing a counter such that y=y+1 to point to a next member $M_{x+1,y}$ for the new population $P_{x+1}$. Task 146 is included in a programming loop and executed N-n times, where "N" is number of members in the population and "n" is the number of best-fitting members $M_{x,BF0 \to n-1}$. Upon the completion of the first iteration of task 146, y=n. After task 146, a task 148 selects a pair of parent members $M_{x+1/2,p0}$ and $M_{x+1/2,p1}$ from the old population $P_x$ for use in forming an offspring member $M_{x+1,y}$. In the preferred embodiment, a randomized process in used in selecting parent members $M_{x+1/2,p0}$ and $M_{x+1/2,p1}$. But the randomized process is desirably weighted by the fitness of the members from the old population $P_x$, as determined above in tasks 116–122 (FIG. 6). Thus, old members $M_{x+1/2,y}$ which demonstrated a greater fitness have a greater likelihood of being selected as parent members $M_{x+1/2,p0}$ and $M_{x+1/2,p1}$ in task 148.

After task 148, a task 150 gets a next coefficient index. Task 150 may be implemented by incrementing a counter such that z=z+1. Task 150 is included in a programming loop and executed "L" times. Upon the completion of the first iteration of task 150, z=0. After task 150, a task 152 forms an offspring normalized offset $NO_{x+3/4,y,z}$ for inclusion in the next population $P_{x+1}$ by combining the corresponding normalized offsets $NO_{x+1/2,y,z}$ of the parent members $M_{x+1/2,p0}$ and $M_{x+1/2,p1}$. Normalized offsets $NO_{x+3/4,y,z}$ are referenced here using the "x+¾" subscript notation because subsequent processing, discussed below, is performed in the preferred embodiment before the new population $P_{x+1}$ is complete. Desirably, task 152 uses a randomized crossover algorithm in forming offspring normalized offset $NO_{x+3/4,y,z}$. The crossover algorithm operates in accordance with a crossover rate (e.g., 40%–60%) that may have been initialized in initializing task 84 (FIG. 3). A suitable crossover algorithm may be consistent with the following relationship:

$$NO_{x+3/4,y,z} = [NO_{x+1/2,p0,z} \text{ AND } R_{CO}] \text{ OR } [NO_{x+1/2,p1,z} \text{ AND } \overline{R_{CO}}] \quad \text{EQ.8}$$

where, $R_{CO}$ is a random mask generated per a specified crossover rate.

Following task 152, a task 154 mutates the offspring normalized offset $NO_{x+3/4,y,z}$, formed in task 152. Task 154 desirably uses a randomized process that operates in accordance with a mutation rate (e.g., 2%–25%). The mutation rate may have been initialized in initializing task 84 (FIG. 3). In accordance with one desirable mutation process, on unusual, but nevertheless substantially random occasions, a bit in the offspring normalized offset $NO_{x+3/4,y,z}$ may be inverted. This affords the new population $P_{x+1}$ an opportunity to identify alternate local minima to the local minimum upon which genetic algorithm 82 may be converging. A suitable mutation algorithm may be consistent with the following relationship:

$$NO_{x+1,y,z} = NO_{x+3/4,y,z} \text{ XOR } R_{MU} \quad \text{EQ.9}$$

where, $R_{MU}$ is a random mask generated per a specified mutation rate.

Upon the completion of task 154 a new normalized offset $NO_{x+1,y,z}$ has been generated, and this new normalized offset $NO_{x+1,y,z}$ corresponds to a new offset component $OC_{x+1,y,z}$ and, through the new baseline component $BC_{x+1,z}$ obtained above in task 132 (FIG. 7), a new coefficient $C_{x+1,y,z}$. This new normalized offset $NO_{x+1,y,z}$ is then placed in the new population $P_{x+1}$.

After task 154 a query task 156 determines whether the last coefficient index has been processed by determining whether z≧L−1. So long as other normalized offsets need to be formed from the current pair of parent members $M_{x+1/2,p0}$ and $M_{x+1/2,p1}$, program control loops back to repeat tasks 150, 152, 154, and 156. When task 156 eventually determines that all normalized offsets have been formed for the current offspring, a query task 158 determines whether the new population $P_{x+1}$ is complete. In other words task 158 determines whether N members are now included in new population $P_{x+1}$, or whether y≧N−1. So long as additional offspring members need to be formed, program control loops back to repeat tasks 146, 148, 150, 152, 154, 156, and 158 as needed until the new population $P_{x+1}$ is complete with N elite and offspring members. When task 158 eventually determines that the new population $P_{x+1}$ is complete, program control exits sub-process 142 and returns to a calling routine, such as genetic algorithm 82 (FIG. 3).

Referring back to FIG. 3, when sub-process 142 is complete, a query task 160 determines whether it is currently appropriate to reduce the worst-case training adjacent channel power (ACP) that may be produced by the operation of genetic algorithm 82. As genetic algorithm 82 tests the fitness of various members of the various populations in sub-process 100, some members may produce relatively bad results that are evidenced by a poor fitness number. These bad results will nevertheless be limited by the search spaces 86, 88 (FIGS. 4–5), and they are unlikely to propagate into future populations. But while they were being tested for fitness they may have caused transmitter 20 to generate undesirable amounts of ACP for brief instants. Dotted skirt-lines 50 in FIG. 2 depict an exemplary worst-case training ACP that may be momentarily expected when transmitter 20 first initializes as it tests pre-distortion functions for fitness. During initial operation, it may be desirable to tolerate the possibility of brief instances of bad results in order to quickly converge to good results.

Thus, for the first few populations tested for fitness during sub-process 100 by genetic algorithm 82, task 160 may determine not to reduce the worst-case training ACP and route program control directly back to sub-process 100. However, ellipsis 162 are shown in this process flow path to indicate that other tasks may nevertheless be performed prior to repeating sub-process 100. In one embodiment, such other tasks may include the programming of pre-distorter 22 with the pre-distortion functions defined by the best-fit member of the previous population so that transmitter 20 may operate for some time using these best-fit pre-distortion functions before again testing a new population for fitness. In another embodiment, search spaces, crossover rates, mutation rates, and other parameters of genetic algorithm 82 that influence worst-case training ACP are all established so that such tasks are unnecessary.

When task 160 determines that genetic algorithm 82 has been operating for some time and/or that transmitter 20 is not often producing relatively bad worst-case ACP during the fitness testing of sub-process 100, a task 164 is performed to alter genetic algorithm 82 to further reduce the worst-case training ACP that may be produced by transmitter 20 during the fitness testing of sub-process 100. Task 164 may reduce the search spaces 86, 88 (FIGS. 4–5), reduce the crossover rate used in forming offspring members in task 152 (FIG. 10), reduce the mutation rate used in mutating offspring members in task 154, or the like. These activities will limit the worst-case training ACP or prevent worst-case training ACP from occurring as often. Dotted skirt-lines 166 in FIG. 2 depict an exemplary worst-case training ACP that may be momentarily expected during the fitness testing of sub-process 100 after the application of task 164 by genetic algorithm 82. Following task 164, program control loops back to sub-process 100 as discussed above. In the preferred embodiment, genetic algorithm 82 remains in a programming loop that includes sub-process 100, sub-process 126, sub-process 142, and task 160 indefinitely so long as transmitter 20 remains operational.

In summary, the present invention provides an improved transmitter with limited spectral regrowth and a method for operating the transmitter to achieve limited spectral regrowth. Narrowband feedback is used to adapt pre-distortion functions implemented in a pre-distorter. The narrowband feedback allows an inexpensive ADC to be used in conditioning a feedback signal processed to adapt pre-distortion functions to improve linearity. A genetic algorithm is implemented to achieve acceptable convergence in a wide variety of circumstances and to limit adjacent channel power emissions. The pre-distortion function adaptation process characterizes polynomial coefficients as having baseline and offset components, then causes the baseline components to track the convergence process. This improves convergence while limiting the worst-case training ACP that may be generated by the transmitter.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method of processing a transmission signal occupying a predetermined frequency band to reduce spectral regrowth outside said predetermined frequency band, said method comprising:
    transforming a modulated form of said transmission signal in accordance with a pre-distortion function configured substantially as a polynomial in the form of a sum of a plurality of terms wherein each of said terms includes a coefficient having a baseline component and an offset component to generate a pre-distorted form of said transmission signal;
    amplifying said pre-distorted form of said transmission signal in a power amplifier to generate an amplified form of said transmission signal having an in-band component within said predetermined frequency band and an out-of-band component outside said predetermined frequency band;
    conditioning said out-of-band component of said amplified form of said transmission signal to generate a feedback signal; and
    applying a genetic algorithm to said feedback signal to modify said pre-distortion function by generating new offset components and altering said baseline components in response to said new offset components.

2. A method as claimed in claim 1 wherein said conditioning activity substantially excludes said in-band component.

3. A method as claimed in claim 1 wherein said conditioning activity is configured so that said feedback signal is responsive to a logarithm of the power exhibited by said out-of-band component of said amplified form of said transmission signal.

4. A method as claimed in claim 1 additionally comprising:
    combining, after said generating activity, said new offset components and said baseline components to form new coefficients; and
    programming a pre-distorter in response to said new coefficients to implement said new pre-distortion function.

5. A method as claimed in claim 4 additionally comprising scaling said new offset components to reside within a predetermined search space prior to said combining activity.

6. A method as claimed in claim 1 wherein said applying activity additionally comprises:
    generating a population of pre-distortion functions;
    identifying a best-fit member from said population of pre-distortion functions, said best-fit member producing the least out-of-band power of all of said pre-distortion functions; and
    moving said baseline components toward said coefficients for said best-fit member of said population of pre-distortion functions.

7. A method as claimed in claim 6 wherein said moving activity moves said baseline components toward said coefficients for said best-fit member by a movement amount, said movement amount being defined by a tracking rate.

8. A method as claimed in claim 6 wherein said applying activity further comprises:
    moving said baseline components toward said coefficients for said best-fit member by a movement amount; and
    adjusting all offset components of all pre-distortion function members of said population in response to said movement amount.

9. A method as claimed in claim 1 wherein said applying activity comprises:
    generating a population of pre-distortion functions, wherein each pre-distortion function is a member of said population;
    repeating said transforming, amplifying, and conditioning activities for each member of said population; and
    identifying a best-fit member from said population, said best-fit member producing less out-of-band power than others of said members.

10. A method as claimed in claim 9 wherein said generating activity generates said population in response to an old population of pre-distortion functions by including elite members from said old population in said population and combining pairs of members from said old population in accordance with a randomized crossover algorithm to generate additional population members.

11. A method as claimed in claim 10 wherein said generating activity additionally applies a randomized mutation algorithm to said additional population members to afford said population an opportunity to identify alternate local minima.

12. A method as claimed in claim 1 additionally comprising:
    performing said transforming, amplifying, conditioning, and applying activities to allow a first worst-case amount of adjacent channel power; and
    after said performing activity, altering said applying activity to form an altered-applying activity that allows a second worst-case amount of adjacent channel power, said second amount being less than said first amount; and
    repeating said transforming, amplifying, and conditioning activities with said altered-applying activity.

13. A method of processing a transmission signal to reduce spectral regrowth, said method comprising:
    transforming a modulated form of said transmission signal to generate a pre-distorted form of said transmission signal, said modulated form of said transmission signal being transformed in accordance with a pre-distortion function configured substantially as a polynomial in the form of a sum of a plurality of terms, wherein each of said terms includes a coefficient having a baseline component and an offset component;

amplifying said pre-distorted form of said transmission signal in a power amplifier to generate an amplified form of said transmission signal;

conditioning said amplified form of said transmission signal to generate a feedback signal; and processing said feedback signal to modify said pre-distortion function into a new pre-distortion function by identifying new offset components, then altering said baseline components in response to said new offset components.

14. A method as claimed in claim 13 additionally comprising:

combining said new offset components and said baseline components to generate new coefficients; and programming a pre-distorter in response to said new coefficients to implement said new pre-distortion function.

15. A method as claimed in claim 14 additionally comprising scaling said new offset components to reside within a predetermined search space prior to said combining activity.

16. A method as claimed in claim 13 wherein:

said processing activity additionally comprises:

generating a population of pre-distortion functions, and identifying a best-fit member from said population of pre-distortion functions, said best-fit member producing the least out-of-band power of all of said pre-distortion functions; and moving said baseline components toward said coefficients for said best-fit member of said population of said pre-distortion functions.

17. A method as claimed in claim 16 wherein said moving activity moves said baseline components toward said coefficients for said best-fit member by a movement amount, said movement amount being defined by a tracking rate.

18. A method as claimed in claim 16 wherein said processing activity further comprises:

moving said baseline components toward said coefficients for said best-fit member by a movement amount; and adjusting all offset components of all pre-distortion function members of said population in response to said movement amount.

19. A method as claimed in claim 13 wherein:

said amplified form of said transmission signal has an in-band component within a predetermined frequency band and an out-of-band component outside said predetermined frequency band; and said conditioning activity conditions substantially only said out-of-band component.

20. A method as claimed in claim 19 wherein said conditioning activity is configured so that said feedback signal is responsive to a logarithm of the power exhibited by said out-of-band component of said amplified form of said transmission signal.

21. A method as claimed in claim 13 wherein said processing activity additionally applies a genetic algorithm to said feedback signal to modify said pre-distortion function.

22. A digital communication transmitter for transmitting a transmission signal occupying a predetermined frequency band while limiting spectral regrowth outside said predetermined frequency band, said transmitter comprising:

a pre-distorter configured to receive a modulated form of said transmission signal, to transform said modulated form of said transmission signal in accordance with a pre-distortion function configured substantially as a polynomial in the form of a sum of a plurality of terms, wherein each of said terms includes a coefficient having a baseline component and an offset component, and to generate a pre-distorted form of said transmission signal;

a power amplifier coupled to said pre-distorter and configured to amplify said pre-distorted form of said transmission signal and to generate an amplified form of said transmission signal having an in-band component within said predetermined frequency band and an out-of-band component outside said predetermined frequency band;

a conditioning circuit coupled to said power amplifier to condition said out-of-band component of said amplified form of said transmission signal, said conditioning circuit generating a feedback signal; and a processor coupled to said conditioning circuit and to said pre-distorter, said processor being configured to apply a genetic algorithm to said feedback signal, to identify new offset components, to alter said baseline components in response to said new offset components, and to modify said pre-distortion function.

23. A transmitter as claimed in claim 22 wherein said conditioning circuit comprises a filter configured to substantially pass said out-of-band component while substantially blocking said in-band component.

24. A transmitter as claimed in claim 22 wherein said conditioning circuit comprises a logarithmic amplifier configured so that said feedback signal is responsive to a logarithm of the power exhibited by said out-of-band component of said amplified form of said transmission signal.

25. A transmitter as claimed in claim 22 wherein said processor is configured to generate a population of pre-distortion functions, wherein each pre-distortion function is a member of said population, and to identify a best-fit member from said population, said best-fit member producing less out-of-band power than others of said members.

* * * * *